United States Patent
Hori et al.

[15] 3,636,843
[45] Jan. 25, 1972

[54] ELECTRONIC FLASHLIGHT ATTACHMENT FOR CAMERA VIEWFINDER

[72] Inventors: Kunihiko Hori; Keno Okuno, both of Kawasaki-shi, Japan

[73] Assignee: Nippon Kogaku K.K., Tokyo, Japan

[22] Filed: Sept. 18, 1969

[21] Appl. No.: 858,977

[30] Foreign Application Priority Data

Sept. 24, 1968 Japan....................................43/82035

[52] U.S. Cl..............................95/11 R, 352/170, 240/2 C
[51] Int. Cl. ................................................G03b 19/02
[58] Field of Search..........................95/11, 11.5; 116/114 J; 240/1.3, 2 C; 352/170, 171

[56] References Cited

UNITED STATES PATENTS

| 3,259,043 | 7/1966 | Pagel | 95/11.5 |
| 3,374,718 | 3/1968 | Hochreiter | 95/11.5 X |
| 2,625,863 | 1/1953 | Kirwin | 95/11.5 |

*Primary Examiner*—John M. Horan
*Assistant Examiner*—Kenneth C. Hutchison
*Attorney*—Harry G. Shapiro

[57] ABSTRACT

An attachment for rotatably mounting the pilot lamp of an electronic flashlight on the camera viewfinder eyepiece. By rotating the pilot lamp with relation to the viewfinder, the person using the camera can keep the pilot lamp within his field of vision while looking through the viewfinder, regardless of the position of the camera.

1 Claims, 6 Drawing Figures

INVENTORS
KUNIHIKO HORI AND
KENO OKUNO

BY  *Harry G. Shapiro*

ATTORNEY

ELECTRONIC FLASHLIGHT ATTACHMENT FOR CAMERA VIEWFINDER

This invention provides a camera viewfinder attachment for mounting the pilot lamp of an electronic flashlight.

When using an electronic flashlight a photographer must often move his camera away from his eye before taking a picture to ascertain if the pilot lamp of the electronic flashlight is indicating that the electronic flash is ready for use.

An object of this invention is to overcome this problem by providing an attachment which can be fitted to the viewfinder eyepiece of the camera and which positions the pilot lamp to enable the photographer to check the pilot lamp without taking his eye from the camera.

When a pilot lamp is positioned above or below and very close to the eyepiece of a camera, the photographer may not be able to see it. The upper and lower lids of the eye restrict the vertical field of vision relative the horizontal field of vision. Therefore, when the photographer turns the camera 90° from the normal horizontal position to the vertical position, a pilot light fixed in relation to the camera body as to be in the horizontal field of view often cannot be seen in the vertical field of view.

Accordingly, this invention permits the pilot lamp to be rotated around the viewfinder eyepiece and to be fixed at any position. Therefore the photographer can check the state of the pilot lamp while looking through the viewfinder even when he is holding the camera in vertical position.

This invention will be described in more detail by referring to an embodiment shown in the accompanying drawings in which.

Figure 1:
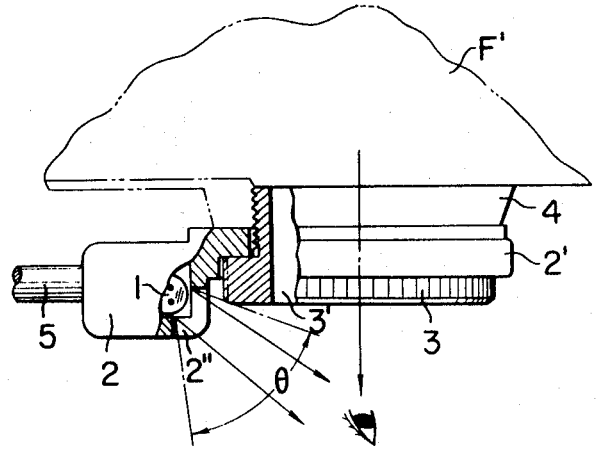
FIG. 1 is the side view of an embodiment of the viewfinder attachment for an electronic flashlight.
Figure 2:
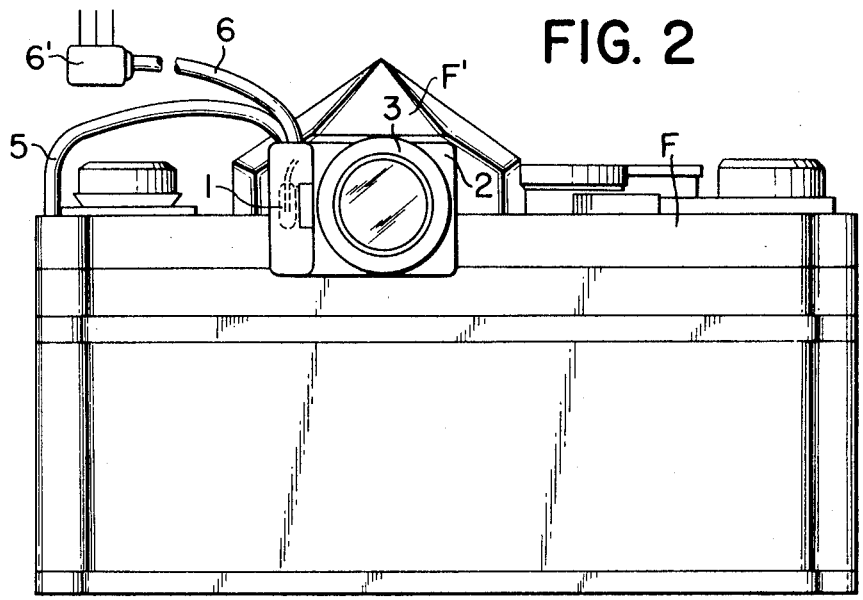
FIG. 2 shows the attachment mounted on the viewfinder, with the camera horizontal.

An embodiment of the attachment according to this invention is shown in FIG. 1 and FIG. 2, where: 1 is a pilot lamp, 2 is a lamp compartment provided with a ring form fitting plate 2' which is rotatably mounted around the viewfinder eyepiece, 2'' is a cutout window for illumination, 3 is a fixing ring which attaches the fitting plate 2' containing the pilot lamp, etc., in the round section to the eyepiece of the camera by means of screw, bayonet, etc. Fitting ring 3 has a hole 3' in the the inside through which the light from the finder passes, 4 is the viewfinder eyepiece, 5 is a syncro cord to be connected to the syncro socket of the camera, 6 is a power cord that connects the equipment with the electronic flash light, 6' is a plug to be used to complete the connection; F is the camera body and F' is a portion of the viewfinder of the camera.

Figure 5:
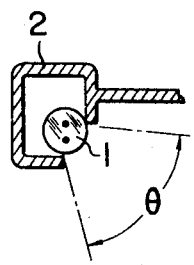
FIG. 5 is the cross section of the pilot lamp compartment.
Figure 6:
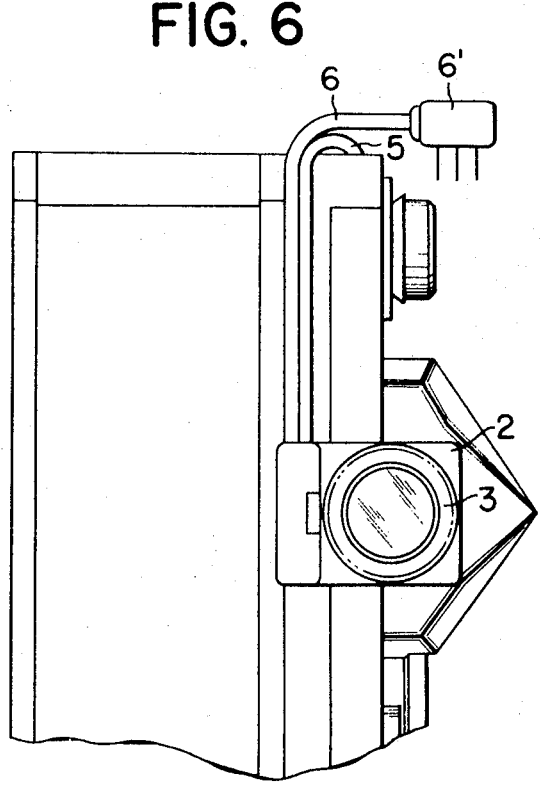
FIG. 6 shows the attachment mounted on the viewfinder rotated to a position 90° from the position shown in FIG. 2.
Figure 3:
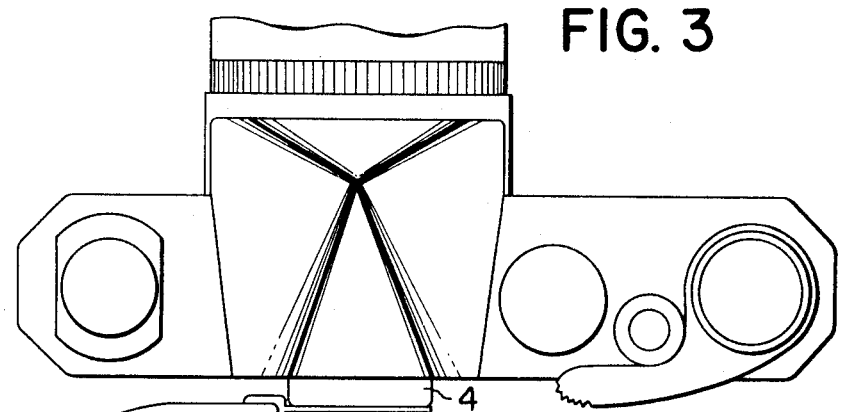
FIG. 3 is the top view of FIG. 2.
Figure 4:
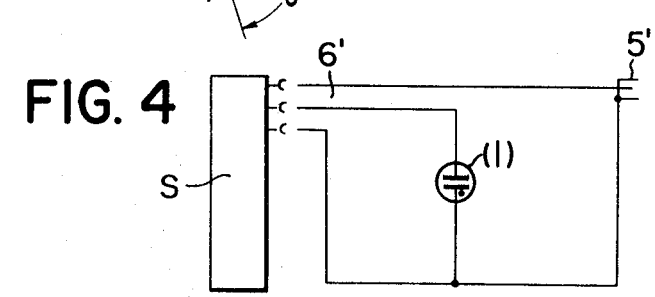
FIG. 4 is the circuit wiring diagram of the electronic flashlight.

FIG. 3 shows said embodiment viewed from above in which the angle of light from the pilot lamp is drawn to show the range in which the pilot lamp can be seen. The illuminating window 2'' extends from a direction parallel to the optical axis of the viewfinder, spreading as wide as the angle $\theta$. FIG. 5 shows in detail the range in which the ready pilot lamp can be seen. FIG. 6 shows electronic flash attachment rotated by 90° and attached to the viewfinder eyepiece of the camera so as to make the pilot lamp easily seen when the camera is held in vertical position.

The ready lamp 1 goes on when the fitting plate 2' is installed to the viewfinder eyepiece 4 of the camera with the aid of the fixing ring 3 and the power cord is connected to an electronic flashlight (s) having a pilot lamp terminal. The pilot lamp will illuminate the eye of the photographer viewing the subject through the viewfinder, so the photographer can check if the pilot lamp is on without taking his eye from the eyepiece provided his eye is within the covering range $\theta$ of the pilot lamp and know that the electronic flashlight is ready. As stated previously, the human eye has a wide field of view in the horizontal directions but has a small field of view in the vertical direction. If the camera is held in the vertical position with the pilot lamp attached at the position shown in FIG. 1, the photographer will find it hard to see whether the pilot lamp is on or not. Therefore when the camera is held vertically the pilot lamp can be rotated to a position different from the original position by up to 90° to allow the eye of the photographer to check the state of the pilot lamp as long as his eye is within the range of $\theta$.

Synchronous flash shooting is possible without using a separate synchro cord if a synchro cord that has a common (-) terminal with the said power cord is used to connect the equipment to the synchro socket of the camera.

As has been described herein, the pilot lamp can be easily checked by the photographer by installing the adapter plate to the viewfinder eyepiece of the camera and connecting the pilot lamp with an electronic flashlight provided with a pilot lamp terminal. Moreover, the pilot lamp can be seen easily even when the camera is in vertical position by only rotating the lamp and fixing the adapter.

What is claimed is:

1. A viewfinder eyepiece adapter for an electronic flashlight comprising a pilot lamp which indicates that the electronic flashlight is ready, a lamp compartment which contains the lamp, a connecting cord having a plug which connects the cord to the electronic flashlight a ring form fitting plate for connecting the lamp compartment to the viewfinder, a fixing ring which mounts the ring form fitting plate to the eyepiece of the camera, a window formed on one portion of the said lamp compartment so that said pilot lamp of the lamp compartment can be directly seen by the eye positioned at the viewfinder eyepiece of the camera, and said lamp compartment being installed in such a way as to be rotatable around the optical axis of the viewfinder eyepiece and fixed to any position by the use of said fixing ring.

* * * * *